Patented Oct. 7, 1947

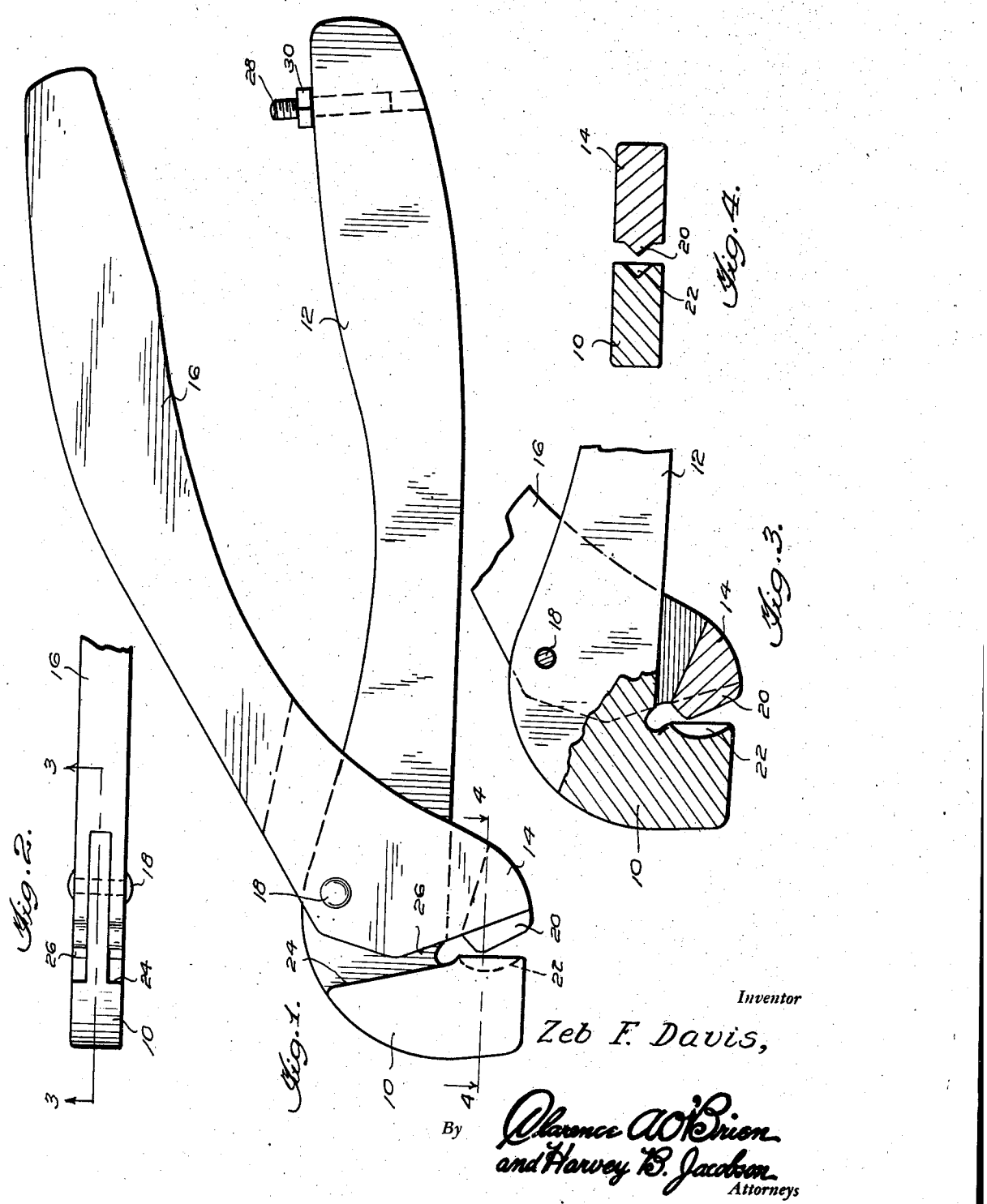

2,428,655

UNITED STATES PATENT OFFICE 2,428,655

CROSSCUT SAW SET

Zeb F. Davis, Candler, N. C.

Application May 8, 1946, Serial No. 668,084

1 Claim. (Cl. 76—64)

This invention relates to a cross cut saw set and more particularly has reference to a hand operated saw set for swaging and adjusting the rake of the teeth of cross cut saws and the like.

An important object of the invention is to provide a saw tooth set which may conveniently swage a saw tooth to a predetermined position without damage to the cutting edge.

Another object of the invention is the provision of a saw set in accordance with the preceding object and wherein an easy adjustment of the set may be effected, in order to obtain various degrees of adjustment of the saw teeth as when using the device on various types of saws.

An additional object of the invention is the provision of a saw set in accordance with each of the foregoing objects, wherein provision is made for the jaws of the saw set gripping the saw as the anvil and hammer swage the teeth thereof.

These, together with numerous other important objects of the invention, which will later become apparent as the following description proceeds, are attained by my device, one embodiment of which has been illustrated by way of example only, in the accompanying drawings, wherein:

Figure 1 is an elevation of the preferred form of the invention, certain concealed parts thereof being shown in dotted lines;

Figure 2 is a top plan detailed view of the jaws of the jaw set;

Figure 3 is a detailed view in longitudinal section, taken substantially upon the section line 3—3 of Figure 2, and Figure 4 is a horizontal sectional view taken substantially upon the section line 4—4 of Figure 1.

In an embodiment of the invention illustrated by way of example in the drawings, numeral 10 designates an angularly disposed jaw member secured or carried by a handle member 12, while 14 indicates a cooperating jaw member forming a part of the handle 16. As shown at 18, the jaw and handle members are pivotally secured together. Suitably formed upon the cooperating surfaces of the jaw members, are an anvil 22 formed as a recess in the head 10, and a hammer protruding from the surface of the jaw 14. As shown more clearly in Figure 4, the anvil and hammer are generally V-shaped in their engaging surfaces. As shown more clearly in Figures 1 and 2, the integral jaw members 10 and 14 are laterally enlarged from their handle portions to form cooperating shoulders 24 and 26 for a purpose to be later set forth. Adjustably threaded into the handle member 12 is an adjusting screw 28 upon which is provided a lock-nut 30 whereby the screw may be adjusted to regulate the closing movement of the handles 12 and 16 and the corresponding closing movement of jaws 10 and 14 with their components the anvil 22 and the hammer 20.

As shown more clearly in Figure 3, the anvil 22 is formed as a cavity, generally V-shaped in cross section and of gradually increasing depth from the toe of the jaw towards the heel thereof. From the foregoing explanation, it is believed that the operation of this device will be now apparent. The toothed edge of a saw is disposed between the members 20 and 22 and upon actuation of the handle members 12 and 16, the hammer of punch 20 engages the appropriate tooth of the saw and swages the same to a predetermined set which is determined by the amount of movement permitted the jaws by the adjustment of the set screw 28. The concavity of the anvil 22 provides clearance whereby the cutting edge of the tooth may be depressed without rubbing against or striking the metal surface of the jaw 10.

If desired, the cooperating surfaces 24 and 26 of the jaws 10 and 14 may be employed as a vice or clamp to straighten teeth of the saw or reduce the amount of set imparted thereto.

It is to be distinctly understood that I do not wish to limit myself to the exact construction shown and described in the drawings and specification, but that I may avail myself of any modifications falling within the scope of the appended claim.

I claim as my invention:

A saw set comprising a pair of pivoted jaws, handles extending from said jaws, a rounded concave anvil portion on one jaw, a hammer on the other jaw, said hammer and anvil being of wedge-shaped cross section, said concave anvil comprising a recess of gradually increasing depth inwardly of the edge of its jaw and of generally triangular shape with its apex inwardly of the jaw, the rear wall of said recess being of arcuate shape.

ZEB F. DAVIS.

REFERENCES CITED

The following references are of record in the file of this patent:

UNITED STATES PATENTS

| Number | Name | Date |
|---|---|---|
| 994,970 | Beard | June 13, 1911 |
| 1,131,105 | Ballard | Mar. 9, 1915 |
| 1,519,592 | Peterson | Dec. 16, 1924 |
| 1,542,471 | Nuessle | June 16, 1925 |
| 1,771,395 | Blokker | July 29, 1930 |
| 2,408,197 | Church | Sept. 24, 1946 |